UNITED STATES PATENT OFFICE.

WILHELM SCHMIDT, OF ARLINGTON, NEW JERSEY.

PROCESS OF REFINING CAMPHOR.

SPECIFICATION forming part of Letters Patent No. 610,664, dated September 13, 1898.

Application filed December 29, 1890. Serial No. 376,110. (No specimens.)

*To all whom it may concern:*

Be it known that I, WILHELM SCHMIDT, a citizen of the German Empire, residing at Arlington, in the county of Hudson and State of New Jersey, have invented certain new and useful Improvements in Pulverulent Camphor and in the Process of Making the Same, of which the following is a specification.

This invention relates to improvements in the process of purifying camphor and reducing it to a granulated crystalline anhydrous state.

Heretofore it has been the custom to purify camphor by sublimation; but by this process a considerable amount of water was united mechanically with the camphor and the refined camphor produced was not absolutely pure. Considerable difficulties were also encountered in pulverizing and granulating the camphor, and this could be accomplished only by crushing it or by the use of cologne spirits, by the use of which latter a certain amount of impurities was also dissolved. A considerable amount of water was also held in the camphor treated with cologne spirits. In manufacturing celluloid and like products and in many other processes in the arts it is very essential to have absolutely pure camphor absolutely free from water and to have the camphor in a crystalline or granulated state.

In carrying out my invention the crude camphor is dissolved in benzin, naphtha, or any other hydrocarbon or solvent that does not mix with water—for example, chloroform, bisulfid of carbon, &c.—which solvent only dissolves the camphor and none of the impurities. The camphor is dissolved in the hydrocarbon or other suitable solvent in a suitable vessel which is provided about one to two inches above its bottom with a cock. As soon as the camphor is dissolved all impurities are precipitated and the mechanically-bound water in the camphor is released, and as its specific gravity is greater than that of the hydrocarbon or other solvent it sinks to the bottom of the vessel, forming there a stratum upon which the solution of hydrocarbon and camphor floats. This solution of hydrocarbon or other solvent and camphor is drawn off from above the precipitated water and impurities through the cock before mentioned and then filtered for the purpose of removing the last traces of impurities and is then conducted into a suitable distilling apparatus which is heated by steam. The greater part of said solvent is distilled off very rapidly and can be condensed to be used in future processes. In the distilling apparatus a hot saturated solution of camphor remains, which is drawn off to a cooling-chamber, and when the same is cooled the greater part of the dissolved camphor is separated and drawn off to be finally filtered. For this purpose the purified camphor is placed into linen filters, and in order to prevent the evaporation of the camphor said filters are placed into closed cans and remain in the same for a sufficient length of time to permit all the fluids to drip off, which fluids are again used in the above-described process. The camphor remaining in the filtering-bags is absolutely pure and white, does not contain even a trace of water, is in a crystalline granulated state, and does not form even the smallest lumps, thus being adapted at once for use in the manufacture of celluloid and other articles and compositions without requiring any manipulation whatever for the purpose of pulverizing it.

Having thus described my invention, I claim as new and desire to secure by Letters Patent—

1. The process described for the purification of crude camphor and its reduction to anhydrous granular camphor crystals, said process consisting in dissolving crude camphor in a closed chamber in a solvent that does not mix with water and having a less specific gravity than water, withdrawing the solvent with the pure camphor in solution from off the stratum of water on which it floats in the dissolving-chamber, driving off the solvent and crystallizing the pure anhydrous camphor held in solution by it, substantially as described.

2. The process described for the purification of crude camphor and its reduction to anhydrous granular camphor crystals, said process consisting in dissolving crude camphor in a closed chamber in a hydrocarbon that does not mix with water such as benzin or naphtha, having a less specific gravity than water, separating the solution of pure camphor by allowing it to float upon the stratum of water set free from the crude camphor by solution, withdrawing the supernatant solution to a closed filtering-chamber, filtering the same and then separating the hydrocarbon solvent by distillation, and crystallizing the pure anhydrous camphor remaining, substantially as described.

3. The process described for purifying crude camphor and reducing it to anhydrous granular camphor crystals, said process consisting in dissolving the pure from the crude camphor by a solvent that does not mix with water and of less specific gravity than water, separating the water set free by the crude camphor from the supernatant solution of pure camphor, driving off the solvent by distillation and filtering the remaining concentrated solution, to separate the remainder of the solvent from the granular mass of crystals of pure anhydrous camphor, substantially as described.

4. The process described for purifying crude camphor and reducing it to anhydrous granular camphor crystals, which consists in dissolving crude camphor in a hydrocarbon that does not mix with water such as benzin or naphtha or other solvent having less specific gravity than water, separating the water yielded by the crude camphor from the supernatant solution of pure camphor by drawing off the latter, filtering said separated solution, driving off the solvent by distillation, crystallizing the pure anhydrous granular camphor, and separating any remaining solvent therefrom by filtering, substantially as described.

In testimony that I claim the foregoing as my invention I have signed my name in presence of two subscribing witnesses.

WILHELM SCHMIDT.

Witnesses:
OSCAR F. GUNZ,
CHARLES SCHROEDER.